Figure 1:
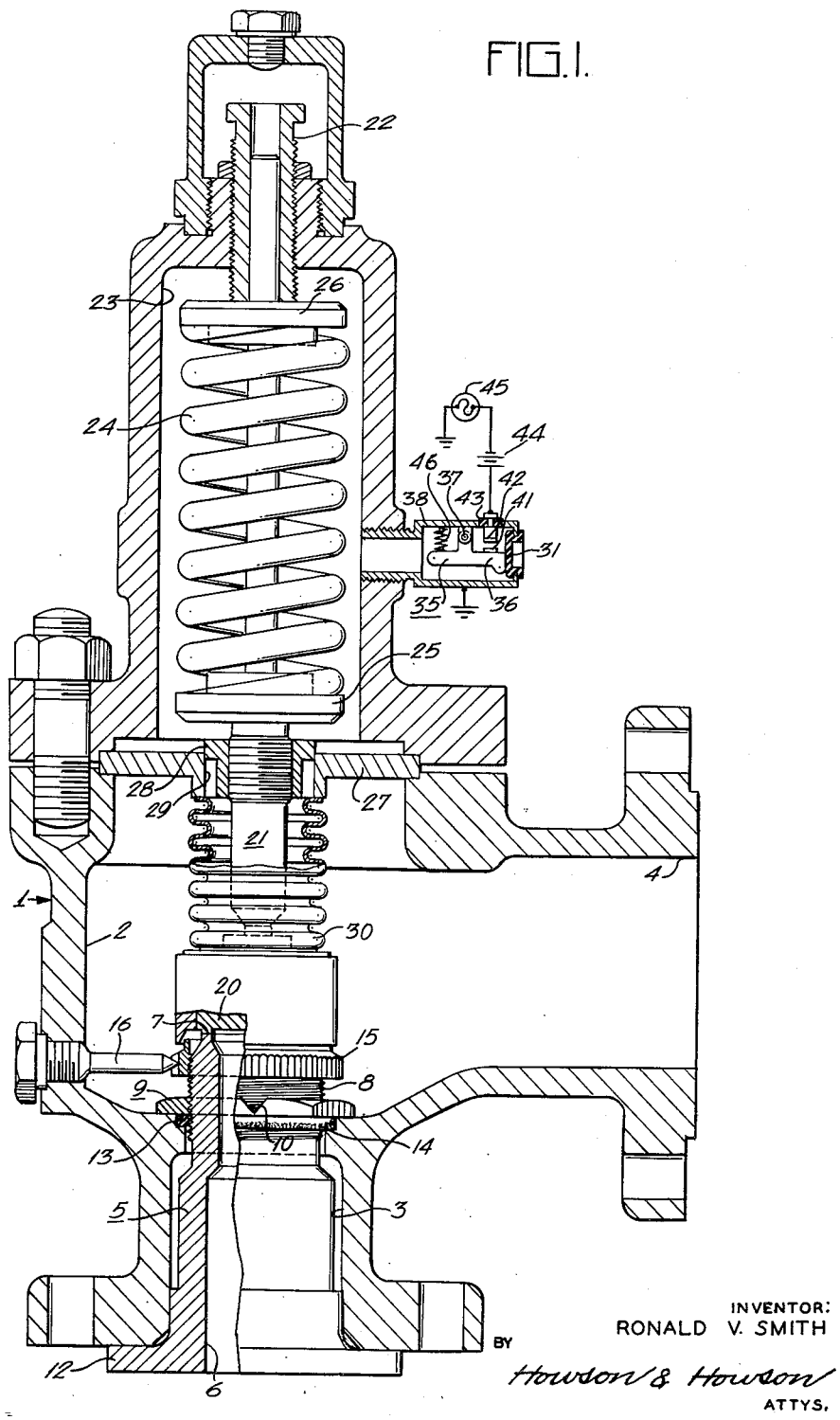

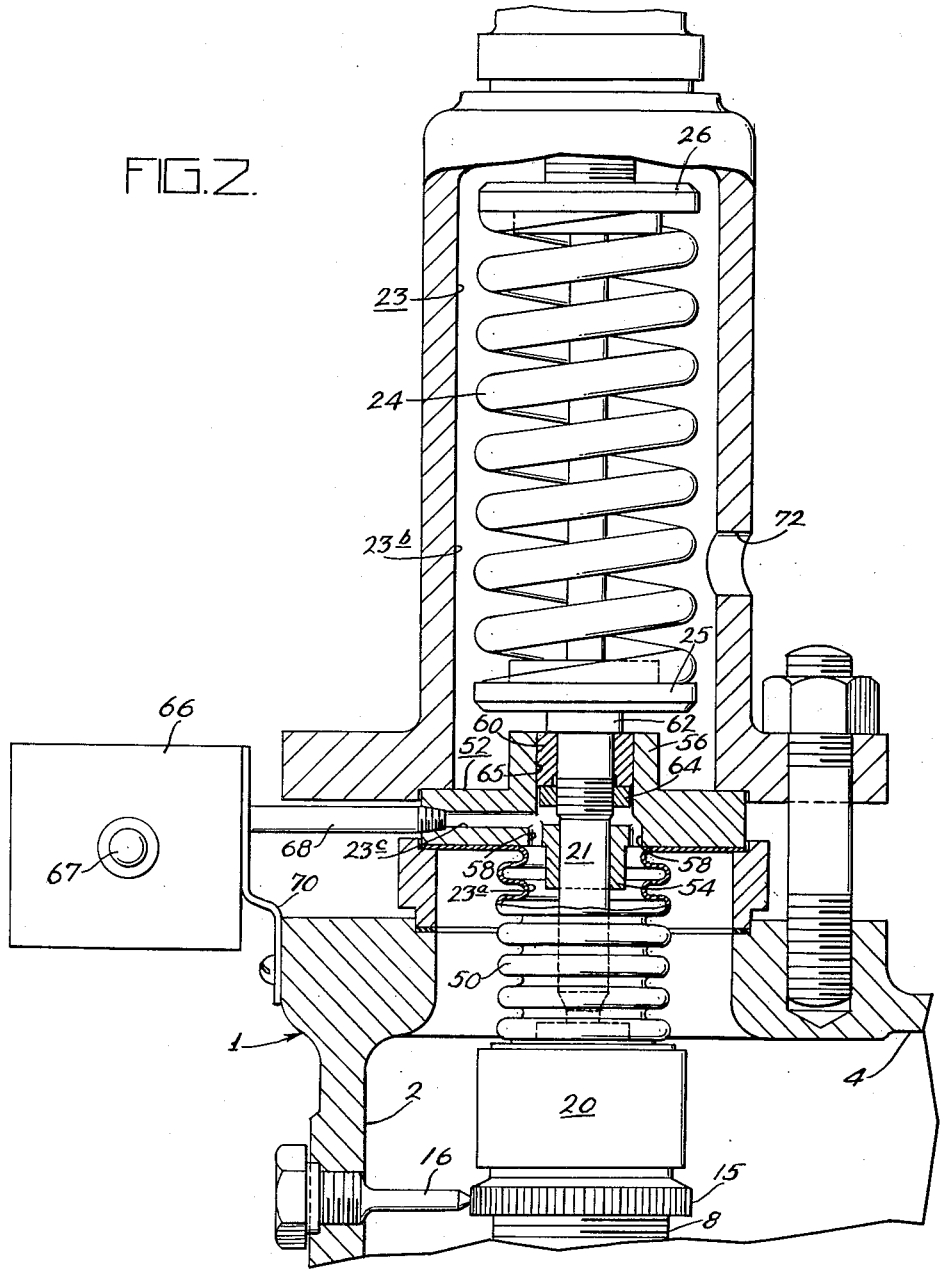

United States Patent Office 3,027,916
Patented Apr. 3, 1962

3,027,916
SAFETY RELIEF VALVE
Ronald V. Smith, Pennsauken, N.J., assignor to J. E. Lonergan Company, Philadelphia, Pa., a corporation of Pennsylvania
Filed Nov. 17, 1959, Ser. No. 853,592
3 Claims. (Cl. 137—557)

The present invention relates to safety relief valves, and has particular application to valves for use on hydrocarbon chemical plants and similar installations where coking and/or corrosive fluids are handled.

The present application is a continuation-in-part application of my co-pending application entitled "Safety Relief Valve," S.N. 808,455, filed on April 23, 1959.

An object of the present invention is to provide an improved valve construction embodying a bellows or diaphragm intermediate the valve element and a spring chamber to seal the latter from the fluid passing through the valve opening, pressure relief means within the spring chamber for discharging pressure therein upon occurrence of a rupture or other leakage in the bellows or diaphragm, and a pressure-sensing mechanism to visibly indicate the rupture or leakage in the bellows or diaphragm.

A further object of the present invention is to provide a spring chamber having pressure relief means therein for discharging pressure in the spring chamber upon occurrence of a rupture or other leakage in the bellows or diaphragm, and a signal means operatively connected to the relief means, operated upon displacement of the pressure relief means in the spring chamber to thereby visibly, audibly, or otherwise indicate a failure in the bellows or diaphragm.

Other objects of the present invention and the various features and details of the operation and construction thereof are more fully set forth hereinafter with reference to the accompanying drawings wherein:

FIG. 1 is a section through a pressure relief valve embodying the present invention; and FIG. 2 is a section through a pressure relief valve showing another embodiment of pressure-sensing and relief means in accordance with the present invention.

Referring now to the drawings, a valve made according to the present invention comprises a spring chamber 23 and a valve casing 1 consisting of a main chamber 2 having an inlet duct 3 and an outlet or discharge duct 4. The outlet duct 4 is in direct communication with the main chamber 2, while the inlet duct has mounted therein a valve nozzle 5 having a lower flange 12 and a central bore 6 terminating at its upper end in a valve seat 7. The upper portion of the nozzle is exteriorly threaded as is indicated at 8 to receive a frangible fastener 9. Tightening the fastener 9 on the threaded portion 8 draws the lower flange 12 of the nozzle tightly against the bottom of the valve body 1, and also effects a seal between the main chamber 2 and the duct 3 surrounding the valve nozzle. In the present instance, the seal is effected by a sealing element 13 seated in a recess 14 of the valve body and operable to be pressed by the fastener 9 into the threads of the threaded portion 8. A warn ring 15 is mounted on the threaded portion 8 in conventional manner for axial adjustment. The ring is retained in adjusted position by a pin 16, but it is removed when dismounting the nozzle.

A valve disc is mounted in the body for axial displacement relative to the nozzle into and out of engagement with the valve seat 7, and is biased into engagement with the seat with a predetermined force so as to be displaced from said seat when the pressure in the bore 6 exceeds the desired maximum value. As shown in the drawing, a valve disc 20 is mounted at the lower end of a stem 21 which is guided for axial displacement in a bushing 22 in the upper end of the spring chamber 23. A spring 24 is compressed between a flange 25 on the stem 21 and a complementary flange 26 on the bushing 22.

Partitioning means is provided to normally prevent fluid communication between the main chamber 2 and the spring chamber 23. In the embodiment illustrated in FIG. 1, the partitioning means comprises a partitioning wall 27 and a diaphragm 30 which separate the spring chamber 23 from the main chamber 2. A balancing bushing 28 is mounted on the stem 21 to cooperate with a central aperture 29 in the partition wall 27. When the valve element 20 is elevated, diaphragm 30 precludes flow of fluid from the main chamber 2 through the aperture 29 since it is mounted in sealing engagement with both the wall 27 and valve element 20 to enclose the stem 21. In the present instance, the diaphragm is in the form of a flexible bellows which may serve to assist in guiding the valve element 20 to its seat upon closure of the valve. In the event of failure of the bellows 30, pressure relief means is provided in the spring chamber 23 to vent the same to atmosphere. In the present instance, the pressure relief means takes the form of a blow-out disc 31 which is displaced in a conventional manner to vent the spring chamber 23.

In accordance with the invention, pressure sensing and signaling means is provided to operate when the pressure builds up in the spring chamber 23. In the embodiment illustrated in FIG. 1, a signal device 45 is operated by a switch 35 responsive to displacement of the blow-out disc 31. The switch 35 comprises a switch arm 36 pivoted as indicated at 37 to a casing extension 38 mounted in the spring chamber 23 and carrying the blow-out disc 31. The switch arm 36 carries a contact 41 cooperable with fixed contact 42 mounted in the extension 38 by an insulator 43. As shown in FIG. 1, the switch arm 36 is biased into engagement with the blow-out plug 31 by means of a spring 46, and the blow-out plug 31 normally holds the arm 36 to maintain the contact 41 out of engagement with the contact element 42. Upon build-up of pressure in the spring chamber 23, for example, upon rupture or other failure of the bellows 30, the plug 31 is displaced outwardly permitting the arm 36 to move under the bias of the spring 46 toward the fixed contact 42 and establish contact between the contacts 41 and 42. This completes a circuit through a voltage source 44 and the signal device 45.

In the embodiment illustrated in FIG. 1, the signal device takes the form of a lamp which is preferably mounted on the valve body 1 with a self-contained voltage source in the form of a battery. Of course other electrical signal devices may be used and an external voltage source may be substituted for the battery 44. If a mechanical signal device is desired, a trigger mechanism responsive to increased pressure in the spring chamber may be employed in the place of the switch 35. The signal device 45 may be located in a control tower for the entire plant under the surveillance of the plant operator if the valve is normally inaccessible. Thus, the present invention provides an indicator which shows when the bellows fails due to rupture or other defect whereby the defect may be corrected before excessive damage occurs.

Another embodiment of pressure relief and sensing means in accordance with the present invention is illustrated in FIG. 2 of the drawings. The parts comprising the main chamber 2, the spring chamber 23 and the pressure relief valve elements are similar to the embodiment shown in FIG. 1. Partitioning means is provided which normally prevents fluid communication between the main chamber 2 and the spring chamber 23. In the present instance, the partitioning means comprises a diaphragm in the form of a flexible bellows 50 which spans between the casing 1 and the valve element 20. A partitioning wall 52 is mounted in the casing 1 to separate the spring chamber 23 into lower and upper portions 23a and 23b respectively. The partitioning wall 52 has a lower cylindrical extension or sleeve 54, within which the valve stem 21 is axially slidable, and a hub portion 56 extending from the partitioning wall 52 upwardly therefrom into the upper spring chamber 23b. A plurality of ports 58 are formed in the partitioning wall 52 to provide free fluid communication between the lower portion 23a and a central chamber 23c formed in the wall 52. A collar 60 is mounted on the valve stem 21 by a lock-nut 64 threadedly mounted on the stem forcing the collar against a shoulder 62 formed on the stem. A slight clearance is provided between the outer peripheral surface of the collar 60 and the central bore 65 of the hub 56 to permit limited fluid communication between the central chamber 23c, the lower portion 23a of the spring chamber, and the upper portion 23b of the spring chamber 23 which is vented to atmosphere as indicated at 72.

A sensing mechanism 66 in fluid communication with the central chamber 23c through conduit 68 is mounted exteriorly of the casing by means of a bracket 70. The sensing mechanism 66 may be of conventional construction which responds to pressure changes in the lower portion 23a of the spring chamber by giving a visible or audible signal as indicated at 67. The clearance between the collar 60 and the bore 65 is preferably small enough so that an increase in pressure in the lower portion 23a of the spring chamber and the central chamber 23c actuates the sensing mechanism 66 prior to venting through the clearance to the atmosphere through the openings 72 in the upper portion 23b of the spring chamber. A clearance of less than .010 inch has been found to be satisfactory to accomplish this.

In the operation of the embodiment of FIG. 2 upon occurrence of pressure in the lower portion 23a of the spring chamber, the pressure is sensed by the sensing mechanism through the central chamber 23c and the conduit 68, which sets off a visible or audible signal 67. The limited clearance between the hub 56 and collar 60 permits gradual venting or bleeding to atmosphere through the opening 72. Pressure in the lower portion of the spring chamber may result from a rupture or failure of the bellows, and with the pressure sensing and relief means of the present invention, the defect may be corrected before excessive damage occurs.

While particular embodiments of the present invention have been herein illustrated and described, it is not intended to limit the invention to such disclosure, but changes and modifications may be made therein and thereto within the scope of the following claims:

I claim:

1. A pressure relief valve comprising a casing having a main chamber and a spring chamber, an inlet bore into said main chamber terminating in a valve seat, a valve element co-operable with said seat to alternatively open and close said inlet bore, spring means mounted in said spring chamber to bias said valve element against the valve seat, a flexible diaphragm mounted between the casing and the valve element, a partitioning wall in said casing separating said spring chamber into upper and lower portions, said diaphragm normally isolating said spring chamber from said main chamber, means defining an opening in the upper portion of said spring chamber, means defining a bore in said partitioning wall, a valve stem on said valve element extending through said bore with limited clearance between said stem and bore whereby pressure in the lower portion of the spring chamber is relieved through said clearance and said opening in the upper portion of the spring chamber, and pressure-responsive signal means connected to the lower portion of said spring chamber operable upon increase of pressure a predetermined amount therein to produce a signal.

2. A valve according to claim 1, wherein said clearance between said valve element and said bore is less than .010 inches, whereby a predetermined increase of pressure in the lower portion of said spring chamber actuates said pressure-responsive signal means prior to being relieved through said clearance to the atmosphere through said opening in the upper portion of said spring chamber.

3. A valve according to claim 1 including means defining a passageway in said partitioning wall communicating with said lower portion of the spring chamber, said pressure-responsive signal means being connected to said passageway whereby a predetermined pressure in said lower portion of the spring chamber effects actuation of said signal means.

References Cited in the file of this patent

UNITED STATES PATENTS

| | | |
|---|---|---|
| 2,691,773 | Lichtenberger | Oct. 12, 1954 |
| 2,693,822 | Gerow | Nov. 9, 1954 |
| 2,698,000 | Rainsbury | Dec. 28, 1954 |
| 2,878,828 | Klafstad | Mar. 24, 1959 |
| 2,880,751 | Tobis | Apr. 7, 1959 |